A. Tschop & J. Hartman.
Horse Rake.

N⁰ 89956.  Patented May 11. 1869.

Witnesses.
C. A. Pettit
Nathan H. Ellsworth

Inventor.
Tschop and Hartman
Munn & Co
Attorneys

UNITED STATES PATENT OFFICE.

ALBERT TSCHOP AND JACOB HARTMAN, OF EAST BERLIN, PENNSYLVANIA.

IMPROVEMENT IN HORSE-RAKES.

Specification forming part of Letters Patent No. 89,956, dated May 11, 1869.

*To all whom it may concern:*

Be it known that we, ALBERT TSCHOP and JACOB HARTMAN, of East Berlin, in the county of Adams and State of Pennsylvania, have invented a new and Improved Horse Hay-Rake; and we do hereby declare that the following is a full, clear, and exact description of the construction and operation of the same, reference being had to the accompanying drawings, making a part of this specification, in which—

Figure 1:
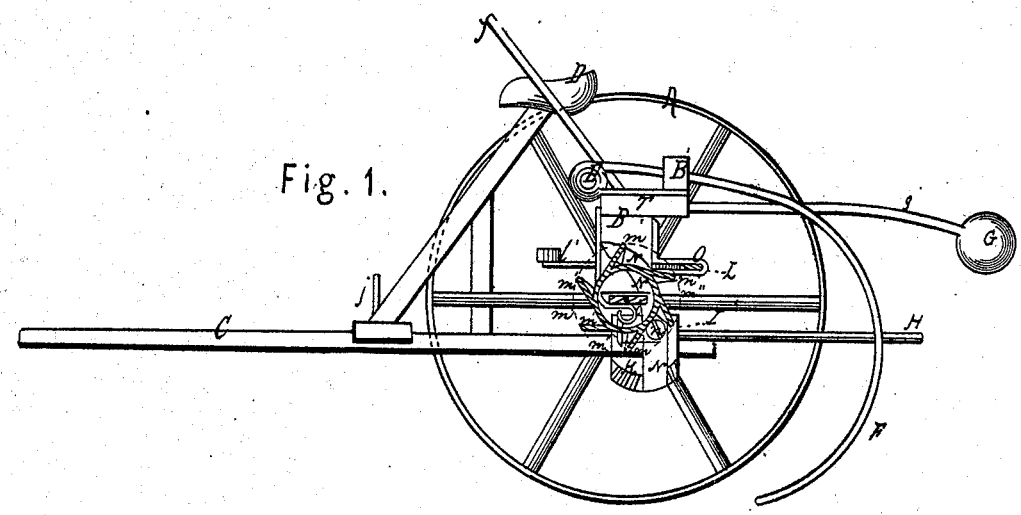
Figure 2:
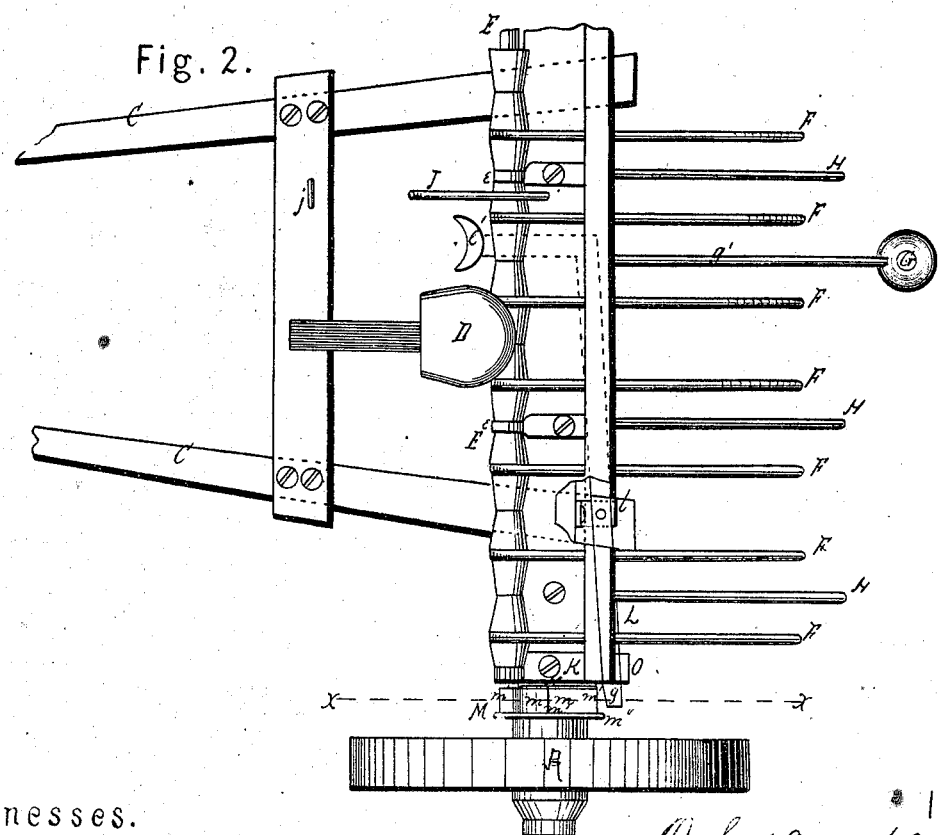

Figure 1 is a longitudinal vertical section. Fig. 2 is a partial top view.

This invention relates to that class of horse hay-rakes in which a tripping-lever is operated by a ratchet attached to the hub of the wheel; and consists, first, in the employment of a guide-plate to hold the end of the lever and prevent it from bending or breaking; secondly, a device for graduating the position and controlling the action of the eccentric which releases the tripping-lever from the ratchet; and, thirdly, a strengthening rim or flange for the ratchet.

In the drawings, A A are the draft-wheels; B, the axle; C, the thills; D, the seat; E, the bar to which the teeth F F are attached, itself capable of rocking, and supported by bearings $e\ e$, projecting from the upper front corner of the axle; B', a flange, projecting upward from the rear edge of the axle and through slots, in which the teeth extend, as seen in Figs. 1 and 2; G, a heavy weight, supported on the rear end of a rod, $g'$, projecting from the axle, for the purpose of bringing the teeth down to the ground when the tripping-lever is disengaged from the ratchet; H H, the cleaning-fingers, projecting backward between the teeth from a bar, I, to which the rear end of the thills is attached, and which is supported under the axle by means of hinges or links $i\ i$; and J, a lever, by means of which the driver can readily rock the axle and raise the teeth from the ground. In going to or returning from the field the lever J may be fastened down by a hook, $j$, thereby permanently raising the teeth.

To the inner end of one of the hubs is attached an annular ratchet-plate, M, consisting of a flat collar, $m$, to which is cast or otherwise fastened a set of inclined plates, $m'$, of uniform thickness, and arranged as seen in Fig. 1, forming the ratchet-teeth, said series of plates being supported and strengthened by a vertical rim, $m''$, at one end of the annular collar, the collar $m$, teeth $m'$, and rim or flange $m''$ all being ordinarily cast in a single piece and bolted to the end of the hub through the collar or through a flange on its inner end extending over a portion of the end of the hub around the axle. This device, for the purpose for which it is here employed, is superior to all others, the plates $m'\ m'$, supported by the flange $m''$, being very firm and strong, and the recesses beneath them being so deep and angular as to catch the tripping-lever readily and hold it securely.

The tripping-lever is shown at L, being pivoted to the axle at $l$, and provided with an arm, $l'$, which extends forward to a convenient position to be operated by the driver's foot or hand.

When the arm $l'$ is thrown forward the end of the lever (seen at $g$, Fig. 2) is not in contact with the ratchet-teeth; but when the arm $l'$ is thrown back the end $g$ engages with said teeth, and the wheel A, by its rotation, carries the lever upward, and thereby rocks the axle and raises the teeth.

The end of the bar L near the ratchet extends through a stout slotted guide-plate, O, firmly fixed to the rear side of the axle.

To the end of the bar I next to the ratchet a stout metallic plate, K, is securely fastened, its lower edge extending considerably below the bar. Upon the face of this plate, at $n$, is pivoted a curved arm, N, eccentric with relation to the ratchet-plate M, its plane parallel with that of the ratchet-plate, and it lying almost or quite in contact with the latter. The lower end of the arm extends down to the bottom of the plate K, and is notched or provided with projections corresponding to projections or indentations on the plate, so that if set at different inclinations from time to time, and screwed firmly to the plate K by means of the pivot-screw $n$, the notches in the one and indentations in the other will engage firmly and effectually prevent the arm from turning on its pivot.

The operation of the arm is to come against the forward edge of the lever L as the axle turns in its bearings by the action of the ratchet, and by its eccentricity to automatically disengage the lever from the ratchet and allow the rake to drop back to position.

The inclination of the arm being adjustable, as above described, it can be made to force the lever away from the ratchet more or less quickly, as may be judged best. This feature of our invention is considered to be practically of no little importance, enabling the working apparatus to be easily adjusted, so that the rake shall not be raised too far, nor yet released too soon.

The lever L being supported by the axle B, and the eccentric-bar N being supported by the bar I, it follows that when the end of the lever runs up on the eccentric it has a tendency to spring the end of the bar I down away from the axle, and thus prevent the lever from disengaging from the ratchet.

To obviate this difficulty, we hinge the bar I, near its extremity, to the under side of the axle, as shown at $t$.

It will be observed that the teeth are attached to a bar, E, and supported by a flange, B', both projecting from or attached to the upper side of the axle B. Instead of their being directly attached to the substance of the axle itself, they may be attached to an independent bar or plate, T, which shall rest upon the upper side of the axle and be fastened to it by screws or otherwise, so that if the wheels or axle get out of repair this bar T can be readily detached and fastened to any other axle whatever, and another horse hay-rake be thereby extemporized with great convenience and dispatch.

The whole machine is simple, and all the improvements which we have connected with it are of such a nature as not to add to its cost or weight, while contributing in an important degree to the perfection of a rake constructed on this principle. It has been thoroughly tested in the field and found to be convenient in operation, and in its working parts above described far more perfect and durable than any heretofore brought into use.

Having thus described our invention, what we claim as new, and desire to secure by Letters Patent, is—

1. The combination and arrangement of plate K, having the notched or roughened lower edge and the curved eccentric-bar N, screwed to said plate at $n$, and having its lower end roughened or notched on the inner side, substantially as and for the purpose described.

2. In connection with the axle B, bar I, lever K, and eccentric N, the hinge $t$, when arranged to operate as and for the purpose set forth.

ALBERT TSCHOP.
JACOB HARTMAN.

Witnesses:
JOHN TSCHOP, Jr.,
JOHN PICKING.